(12) United States Patent
Dorum

(10) Patent No.: US 9,858,487 B2
(45) Date of Patent: *Jan. 2, 2018

(54) METHOD AND APPARATUS FOR CONVERTING FROM AN ANALYTICAL CURVE ROAD GEOMETRY TO A CLOTHOID ROAD GEOMETRY

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,754

(22) Filed: Feb. 19, 2015

(65) Prior Publication Data

US 2016/0247029 A1    Aug. 25, 2016

(51) Int. Cl.
| | |
|---|---|
| *G06K 9/00* | (2006.01) |
| *G06T 3/00* | (2006.01) |
| *G06T 11/20* | (2006.01) |
| *B60W 50/00* | (2006.01) |
| *G01C 21/32* | (2006.01) |
| *G06F 17/30* | (2006.01) |

(52) U.S. Cl.
CPC ......... *G06K 9/00791* (2013.01); *B60W 50/00* (2013.01); *G01C 21/32* (2013.01); *G06F 17/30241* (2013.01); *G06T 3/00* (2013.01); *G06T 11/203* (2013.01)

(58) Field of Classification Search
CPC ............................... B60W 40/06; G01C 21/32
See application file for complete search history.

(56) References Cited

U.S. PATENT DOCUMENTS

| | | | |
|---|---|---|---|
| 6,405,128 B1 | 6/2002 | Bechtolsheim et al. | |
| 6,438,494 B1 | 8/2002 | Yamamoto et al. | |
| 7,084,882 B1 | 8/2006 | Dorum et al. | |
| 7,089,162 B2 * | 8/2006 | Nagel | G01C 21/32 |
| | | | 701/409 |

(Continued)

FOREIGN PATENT DOCUMENTS

| | | |
|---|---|---|
| DE | 10114412 | 11/2002 |
| EP | 2418460 A2 | 2/2012 |
| KR | 20130057893 | 6/2013 |

OTHER PUBLICATIONS

McCrae et al., *Sketching Piecewise Cothoid Curves*, The Eurographics Assoication (2008) 8 pages.

(Continued)

*Primary Examiner* — Siamak Harandi
(74) *Attorney, Agent, or Firm* — Alston & Bird LLP

(57) ABSTRACT

A method, apparatus and computer program product are provided in order to convert a representation of a road geometry in the form of an analytical curve to a clothoid road geometry. In the context of a method, a plurality of break-point locations are determined along an analytical curve that represents a portion of the road network. The method determines the plurality of break-points locations by determining the plurality of break-point locations depending upon a curvature profile of the analytical curve so as to define one more sections of the analytical curve based upon the break-point locations. The method also converts one of more sections of the analytical curve to respective clothoids.

20 Claims, 16 Drawing Sheets
(1 of 16 Drawing Sheet(s) Filed in Color)

(56) References Cited

U.S. PATENT DOCUMENTS

| | | |
|---|---|---|
| 7,152,022 B1 | 12/2006 | Joshi |
| 7,477,988 B2 | 1/2009 | Dorum |
| 7,725,424 B1 | 5/2010 | Ponte |
| 7,912,879 B2 | 3/2011 | Witmer |
| 8,725,474 B2 | 5/2014 | Dorum et al. |
| 8,762,046 B2 | 6/2014 | Dorum et al. |
| 8,786,599 B2 | 7/2014 | Piergiovanni |
| 2003/0100992 A1 | 5/2003 | Khosla |
| 2003/0101036 A1 | 5/2003 | Nagel |
| 2008/0005212 A1 | 1/2008 | Levien |
| 2009/0208098 A1 | 8/2009 | Yang |
| 2010/0082248 A1 | 4/2010 | Dorum et al. |
| 2013/0006473 A1 | 1/2013 | Buerkle et al. |
| 2014/0149014 A1 | 5/2014 | Grothe et al. |
| 2016/0059848 A1 | 3/2016 | Kim et al. |
| 2016/0167665 A1 | 6/2016 | Park |

OTHER PUBLICATIONS

Scalamadre, A. et al., *The Use of Rational B-Spline Curves in Geometrical Design of Road Alignments*, 1st International Conference on Computer applications in Transportation Systems, Retrieved from the internet: <URL http://xoomer.virgilio.it/antfraca/spline.htm>. (Jun. 24-26, 1996) 10 pages.

Schindler, A. et al, *Generation of High Precision Digital Maps Using Circular Arc Splines* [retrieved Feb. 10, 2016]. Retrieved from the Internet: <URL: https://www.forwiss.uni-passau.de/extern/doc/IV_2012.pdf> 6 pages.

Office Action for corresponding U.S. Appl. No. 14/625,722 dated Jul. 28, 2016.

International Search Report and Written Opinion for Application No. PCT/IB2016/050913 dated May 4, 2016.

McCrae, J. et al., *Sketching Piecewise Clothoid Curves*, Computers & Graphics 33 (2009) 452-461.

Walton, D. J. et al. *A controlled clothoid spline.* Computers and Graphics, Elsevier, GB, vol. 29, No. 3, Jun. 1, 2005; XP027759680; pp. 353-363.

International Search Report and Written Opinion for corresponding International Patent Application No. PCT/IB2016/050914 dated May 19, 2016, 15 pages.

Final Office Action for U.S. Appl. No. 14/625,722 dated May 18, 2017, 14 pages.

* cited by examiner

METHOD AND APPARATUS FOR CONVERTING FROM AN ANALYTICAL CURVE ROAD GEOMETRY TO A CLOTHOID ROAD GEOMETRY

TECHNOLOGICAL FIELD

An example embodiment of the present invention relates generally to the representation of a road network, such as for use by a map display or advanced driver assistance systems (ADAS) and, more particularly, to a method and apparatus for converting from an analytical curve road geometry to a clothoid road geometry.

BACKGROUND

ADAS was developed to improve the comfort, efficiency, safety and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and light detection and ranging (LIDAR) systems.

Some advanced driver assistance systems also use digital map data. These systems are sometimes referred to as map-enhanced ADAS. The digital map data can be used in advanced driver assistance systems to provide information about the road network, road geometry, road conditions and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

The digital map data that is utilized by map-enhanced ADAS generally represents a road network with a link geometry including a plurality of polylines. Although a polyline link geometry may be useful with respect to a map system, some ADAS may be developed that prefer the data representative of a road network to be provided in another form, such as a clothoid road geometry. In this regard, clothoids are utilized in conjunction with road design and a clothoid-based road geometry may be utilized for map displays and to support ADAS capabilities. However, many challenges exist in regards to creating a clothoid road geometry from the polyline link road geometries currently utilized by map displays and ADAS.

BRIEF SUMMARY

A method, apparatus and computer program product are provided in order to convert a representation of a road geometry in the form of an analytical curve to a clothoid road geometry, such as to represent two dimensional or three dimensional road geometries. By converting the analytical curve geometry to a clothoid road geometry in an efficient and accurate manner, the resulting clothoid road geometry may be utilized for a map display and to support ADAS capabilities.

In an example embodiment, a method is provided that includes determining a plurality of break-point locations along an analytical curve that represents a portion of the road network. The method determines the plurality of break-points locations by determining the plurality of break-point locations depending upon a curvature profile of the analytical curve so as to define one more sections of the analytical curve based upon the break-point locations. The method of this example embodiment also includes converting one of more sections of the analytical curve to respective clothoids.

The method of an example embodiment converts one of more sections of an analytical curve to respective clothoids by determining, for a section of the analytical curve having a start break-point and end break-point, coordinates in accordance of the analytical curve at the start break-point and the end break-point. The method of this example embodiment also converts one of more sections of the analytical curve to respective clothoids by determining one of the tangent headings or the curvatures of the analytical curve at the start break-point and the end break-point. The method of this example embodiment further converts one or more sections of the analytical curve to respective clothoids by determining respective clothoids based upon the coordinates and one of the tangent headings or the curvatures of the analytical curve at the start break-point and the end-break point.

The method of an example embodiment also includes determining the curvature profile defining a curvature the analytical curve at a respect arc length and identifying one or more zero-crossings in the curvature profile so as to define curves therebetween. The method of an example embodiment also includes determining whether the subtended angular arc of a curve of the curvature profile is within a predefined threshold of the chord of the curve and identifying the curve to be straight in an instance in which the subtended angular arc of the curve is within the predefined threshold of the chord of the curve. The method of an example embodiment also includes identifying one or more kinks in a curve and splitting a curve into two or more curves sections at the kinks. The method of an embodiment also includes identifying a curve to be multi-modal and splitting the multi-modal curve into two or more curve sections. The method of an example embodiment also includes approximating the curvature profile of the curve with a plurality of polylines. In this example embodiment, the method determines the plurality of break-point locations by determining the break-point locations based upon vertices and zero-crossings of the plurality of polylines.

In another example embodiment, an apparatus is provided that includes at least one processor and at least one memory including computer program code with the at least one memory and the computer program code configured to, with a processor, cause the apparatus to at least determine a plurality of break-point locations along an analytical curve that represents a portion of the road network. The at least one memory and the computer program code are configured to, with the processor, cause the apparatus to determine the plurality of break-point locations dependent upon a curvature profile of the analytical curve so as to define one or more sections of the analytical curve based upon the break-point locations. The at least one memory and the computer program code are also configured to, with the processor, cause the apparatus of this example embodiment to convert one or more sections of the analytical curve to respective clothoids.

The at least one memory and the computer program code are configured to, with the processor, cause the apparatus of an example embodiment to convert one of more sections of the analytical curve to respective clothoids by determining, for a section of the analytical curve having a start break-point and an end break-point, coordinates of the analytical curve at the start break-point and the end break-point. The at least one memory and the computer program code are also configured to, with the processor, cause the apparatus of this example embodiment to convert one or more sections of the analytical curve to respective clothoids by determining one of the tangent headings or the curvatures of the analytical curve at the start break-point and the end break-point. The at least one memory and the computer program code are further configured to, with the processor, cause the apparatus of this example embodiment to convert one or more sections of the analytical curve into respective clothoids by determining the respective clothoids based upon the coordinates and one of the tangent headings or the curvatures of the analytical curve at the start break-point and the end break-point.

The at least one memory and the computer program code are further configured to, with the processor, cause the apparatus of an example embodiment to determine the curvature profile defining a curvature of the analytical curve at a respective arc length and to identify one or more zero-crossings in the curvature profile so as to define curves therebetween. The at least one memory and the computer program code are also configured to, with the processor, cause the apparatus of an example embodiment to determine whether a subtended angular arc of the curve of the curvature profile is within a predefined threshold of a chord of the curve and to identify the curve to be straight in an instance in which the subtended angular arc of the curve is within the predefined threshold of the chord of the curve. The at least one memory and the computer program code are also configured to, with the processor, cause the apparatus of an example embodiment to identify one or more kinks in a curve and to split the curve into two or more curves sections at the kink. The at least one memory and the computer program code are also configured to, with the processor, cause the apparatus of an example embodiment to identify a curve to be a multi-modal and to split the multi-modal curve into two or more curve sections. The at least one memory and the computer program code are also configured to, with the processor, cause the apparatus of an example embodiment to approximate the curvature profile of a curve with a plurality of polylines. The at least one memory and the computer program code are also configured to, with the processor, cause the apparatus of this example embodiment to determine the plurality of break-point locations by determining the break-point locations based upon vertices and zero-crossings of the plurality of polylines.

In a further example embodiment, a computer program product is provided that includes at least one non-transitory computer-readable storage medium having computer-executable program code portions stored therein with the computer-executable program code portions including program code instructions configured to determine a plurality of break-point locations along an analytical curve that represents a portion of a road network. The program code portions that are configured to determine the plurality of break-point locations include program code instructions configured to determine the plurality of break-point locations dependent upon a curvature profile of the analytical curve so as to define one or more sections of the analytical curve based upon the break-point locations. The computer-executable program code portions of this example embodiment also include program code instructions configured to convert one or more sections of the analytical curve to respective clothoids.

The program code instructions configured to convert one or more sections of the analytical curve to respective clothoids include, in an example embodiment, program code instructions configured to determine, for a section of the analytical curve having a start break-point and an end break-point, coordinates of the analytical curve at the start break-point and the end break-point. The program code instructions configured to convert one or more sections of the analytical curve to respective clothoids also include, in this example embodiment, program code instructions configured to determine one of the tangent headings or the curvatures of the analytical curve at the start break-point and the end break-point. In this example embodiment, the program code instructions configured to convert one or more sections of the analytical curve to respective clothoids further include program code instructions configured to determine the respective clothoid based upon the coordinates and the tangent headings or the curvatures of the analytical curve at the start break-point and the end break-point.

The computer-executable program code portions of another example embodiment also include program code instructions configured to determine the curvature profile defining a curvature of the analytical curve at a respective arc length and to identify one or more zero-crossings in the curvature profile so as to define curves therebetween. In this example embodiment, the computer-executable program code portions further include program code instructions configured to approximate the curvature profile of a curve with a plurality of polylines. In this example embodiment, the program code instructions configured to determine a plurality of break-point locations include program code instructions configured to determine the break-point locations based upon vertices and the zero-crossings of the plurality of polylines.

In yet another example embodiment, an apparatus is provided that includes means for determining a plurality of break-point locations along an analytical curve that represents a portion of a road network. In this example embodiment, the means for determining a plurality of break-point locations includes means for determining the plurality of break-point locations dependent upon a curvature profile of the analytical curve so as to define one or more sections of the analytical curve based upon the break-point locations.

The apparatus of this example embodiment also includes means for converting one or more sections of the analytical curve to respective clothoids.

BRIEF DESCRIPTION OF THE DRAWINGS

The patent application file contains at least one drawing executed in color. Copies of this patent application with color drawings will be provided by the Office upon request and payment of the necessary fee.

Figure 1:
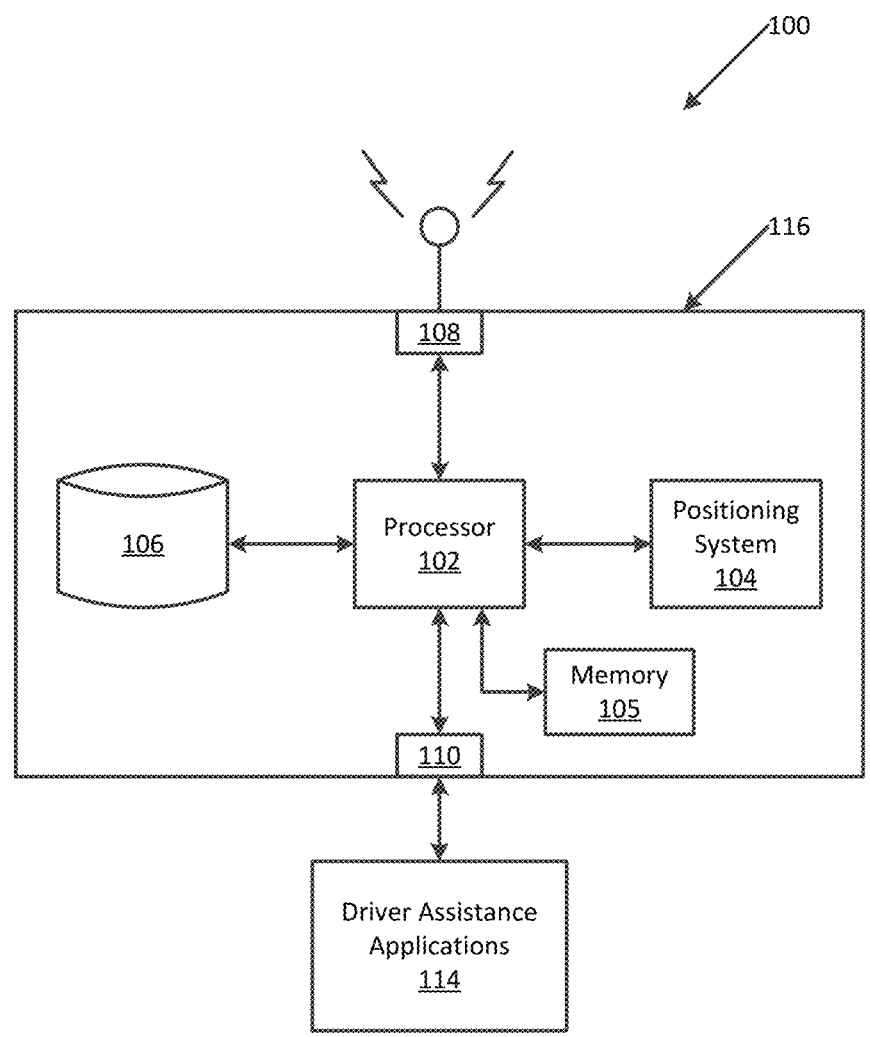
Figure 2:
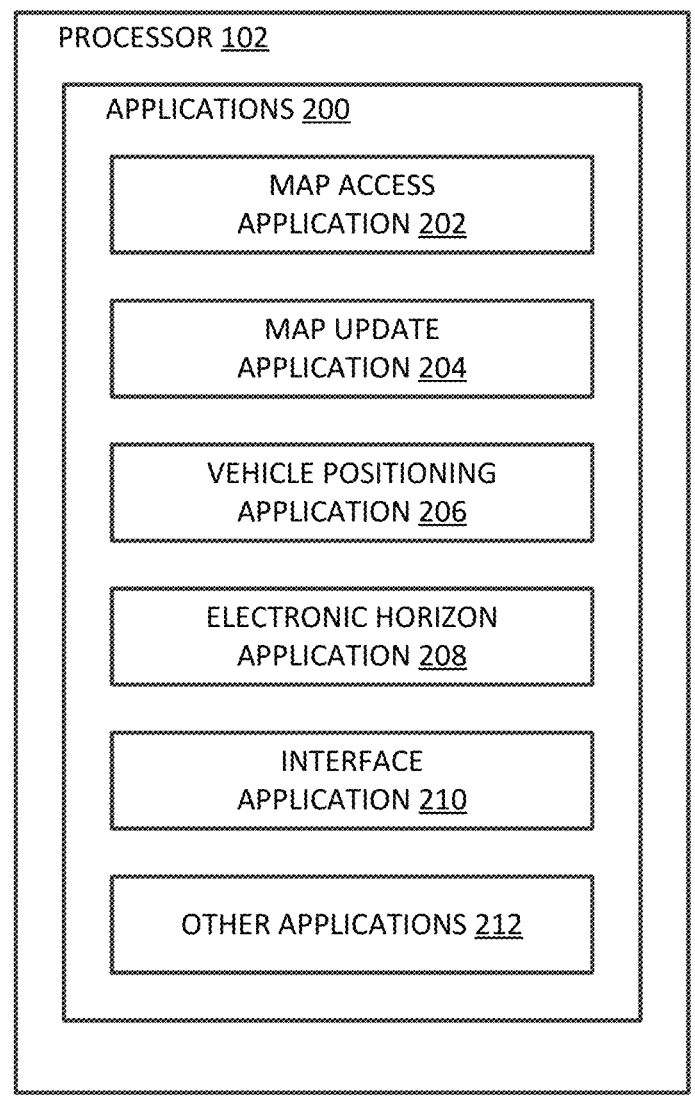
Figure 3:
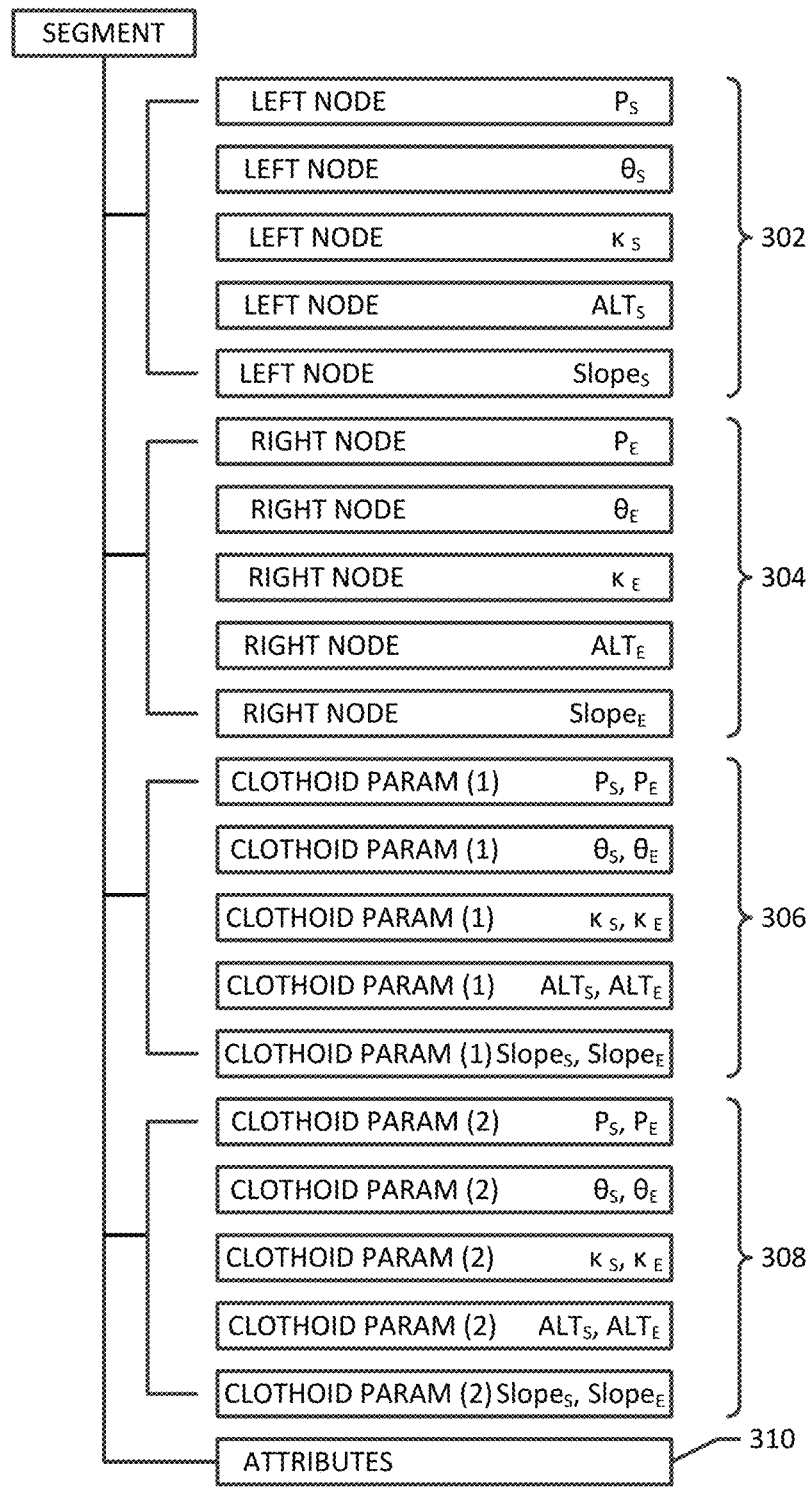
Figure 4:
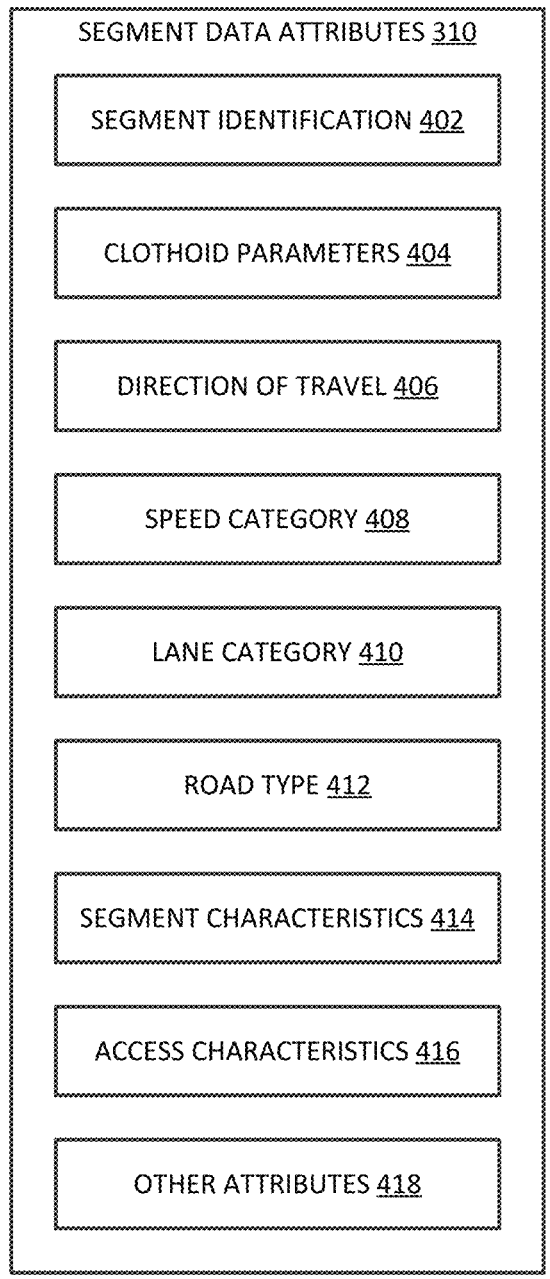
Figure 5:
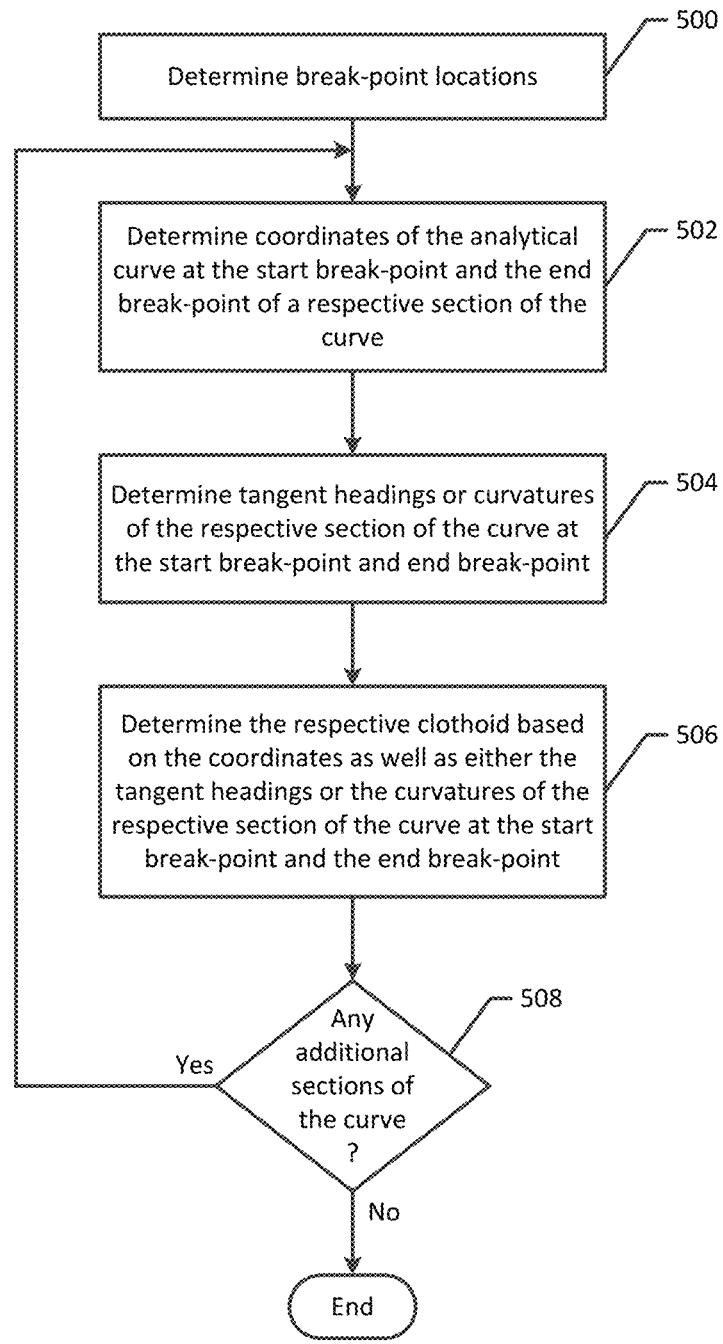
Figure 6:
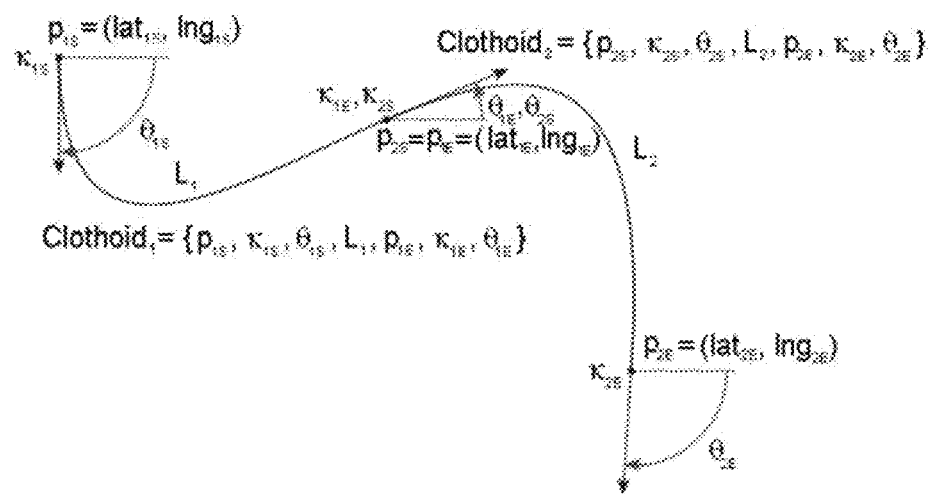
Figure 7A:
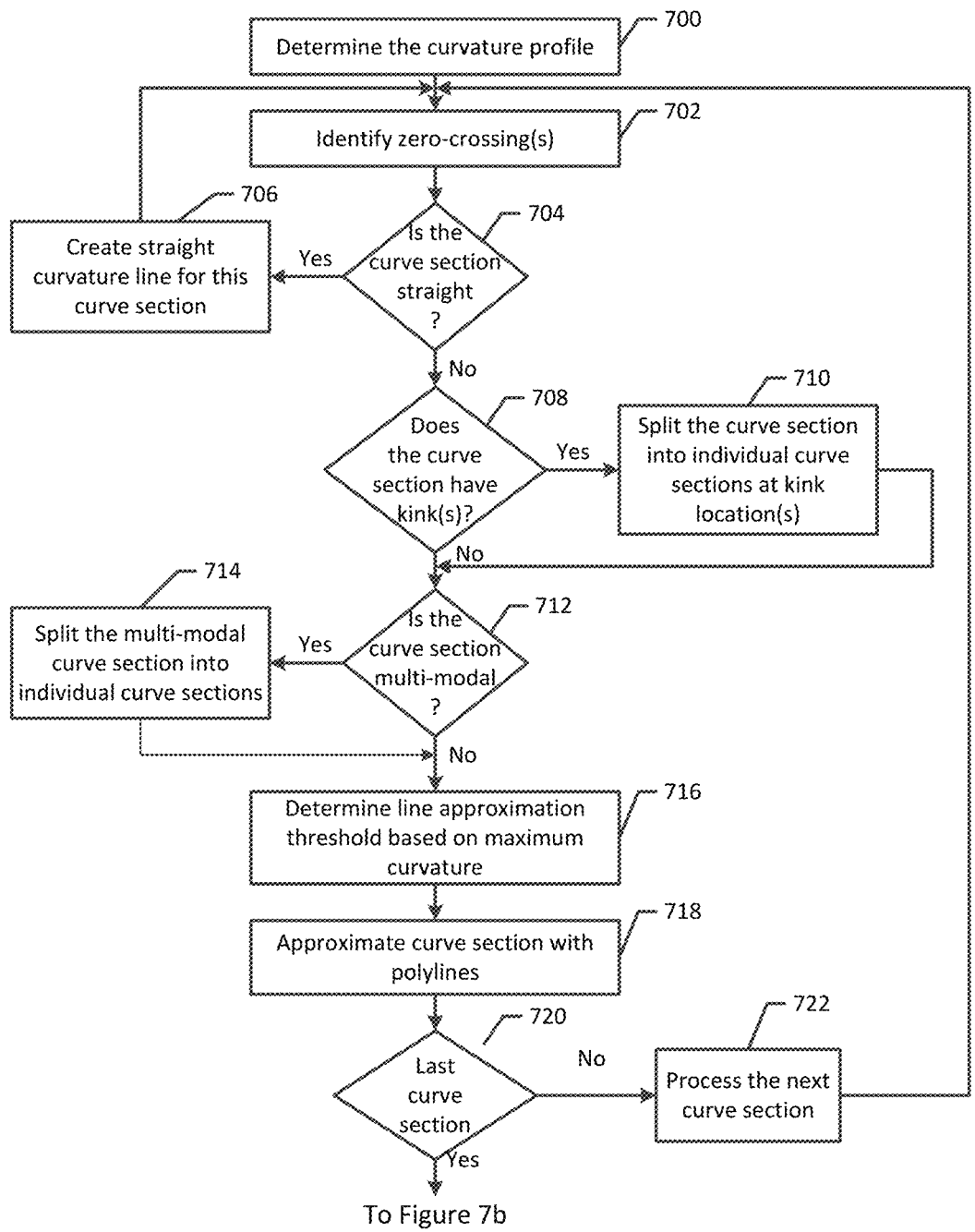
Figure 7B:
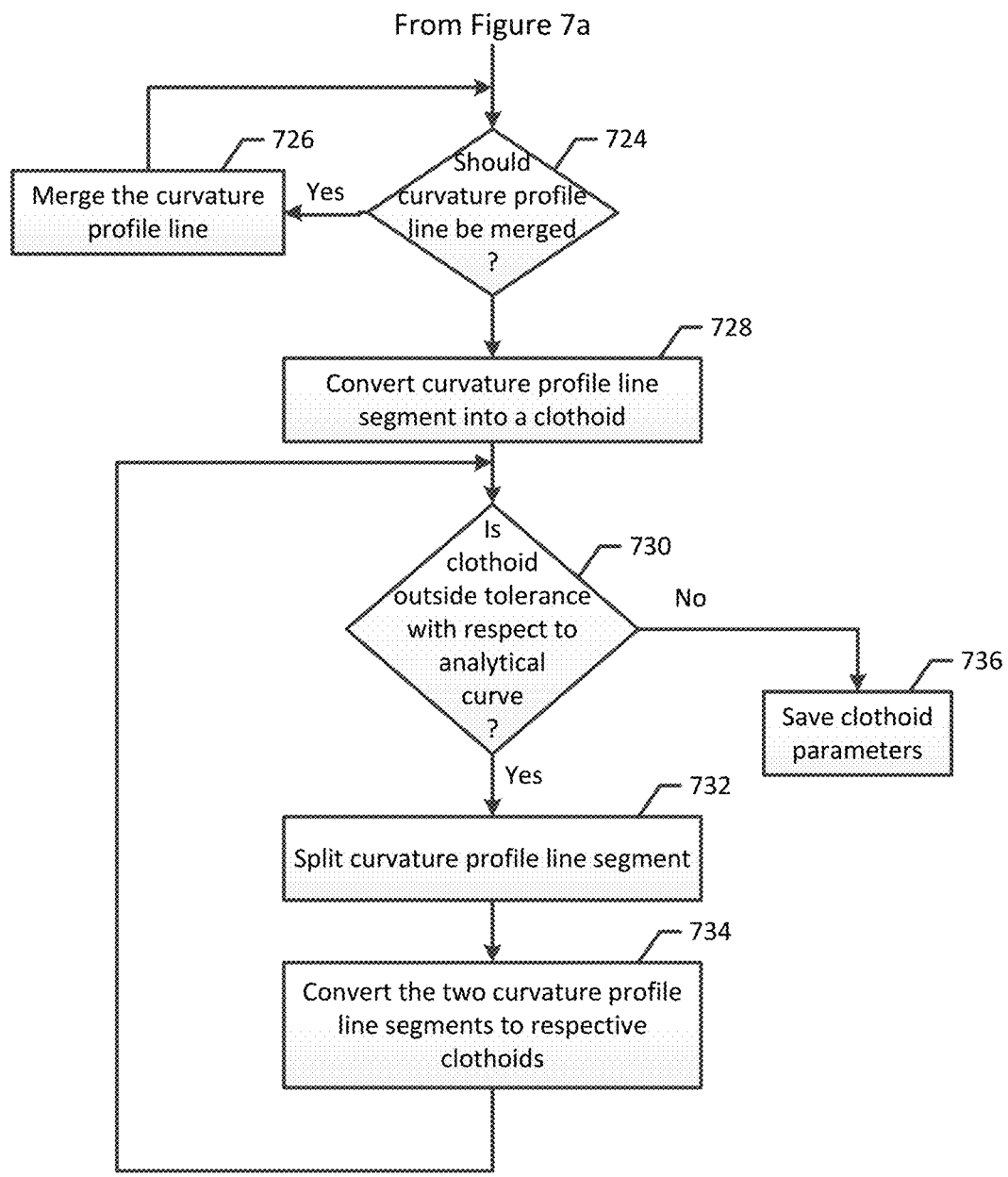
Figure 8:
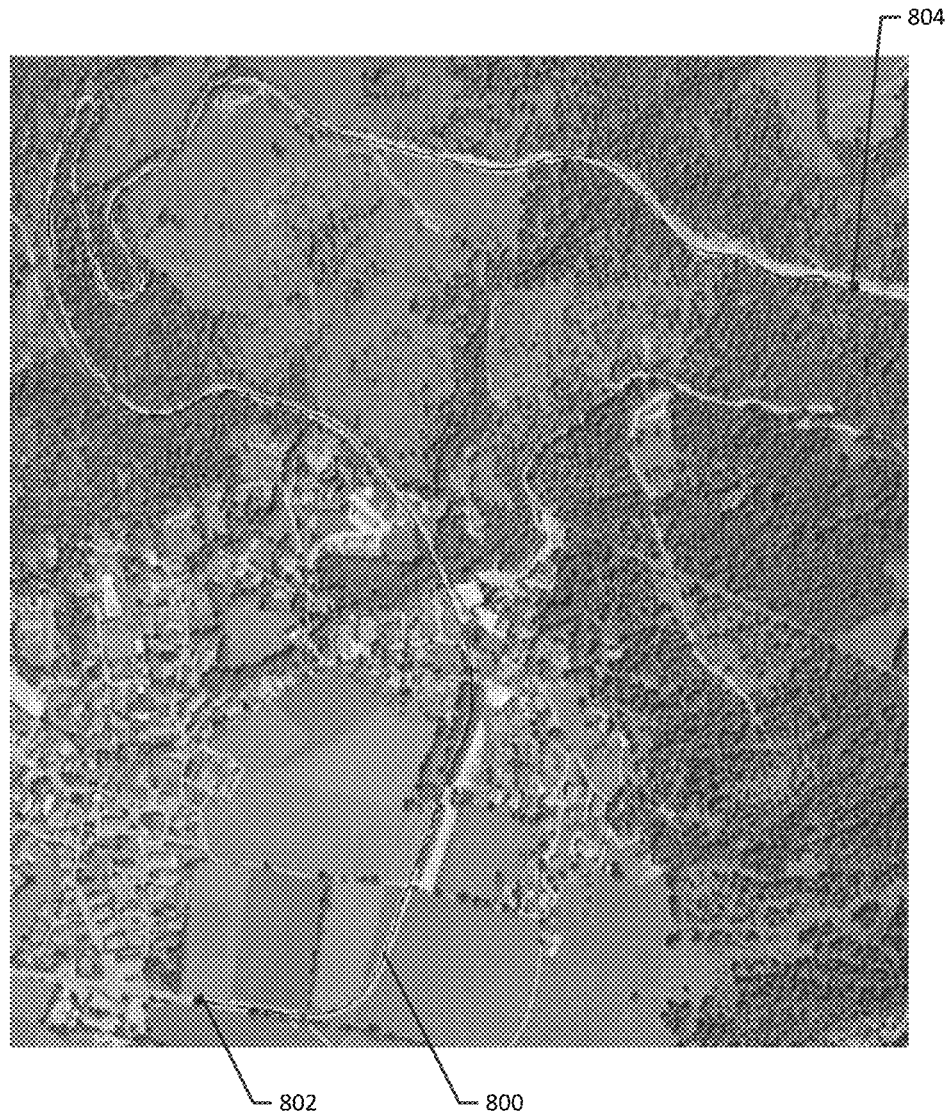
Figure 9:
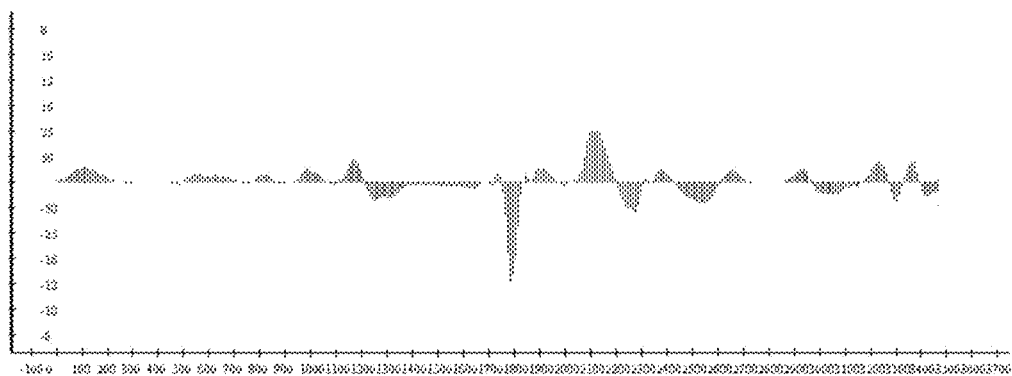
Figure 10:
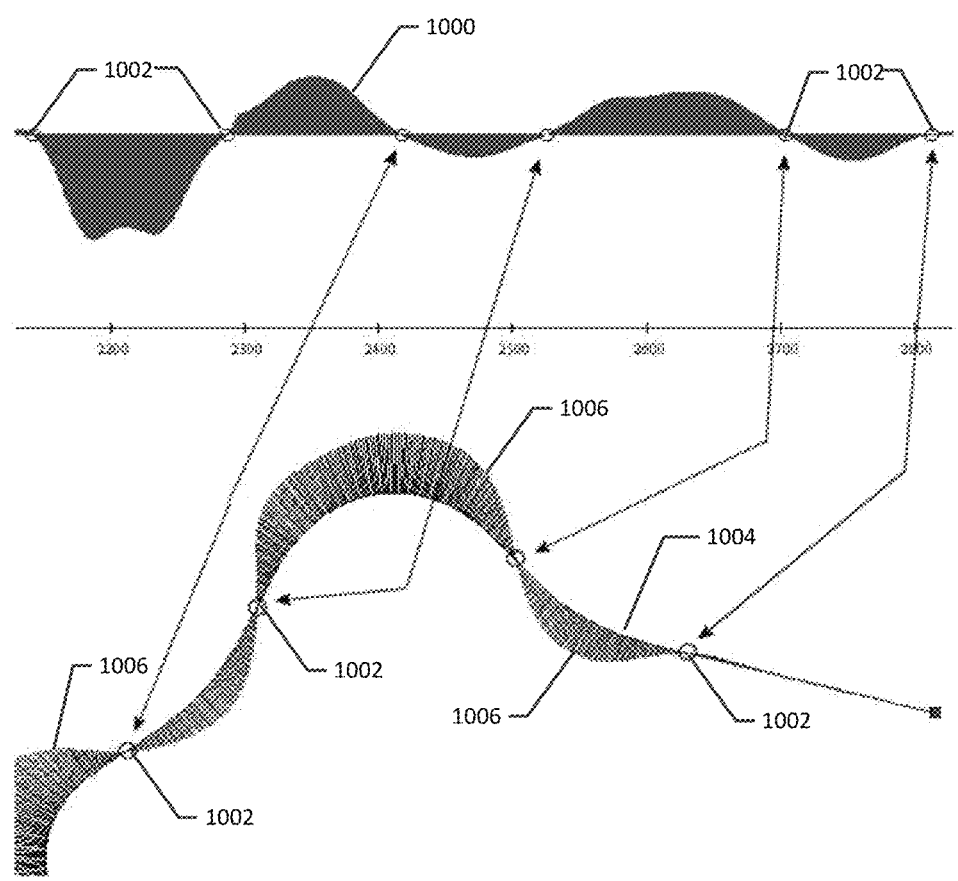
Figure 11:
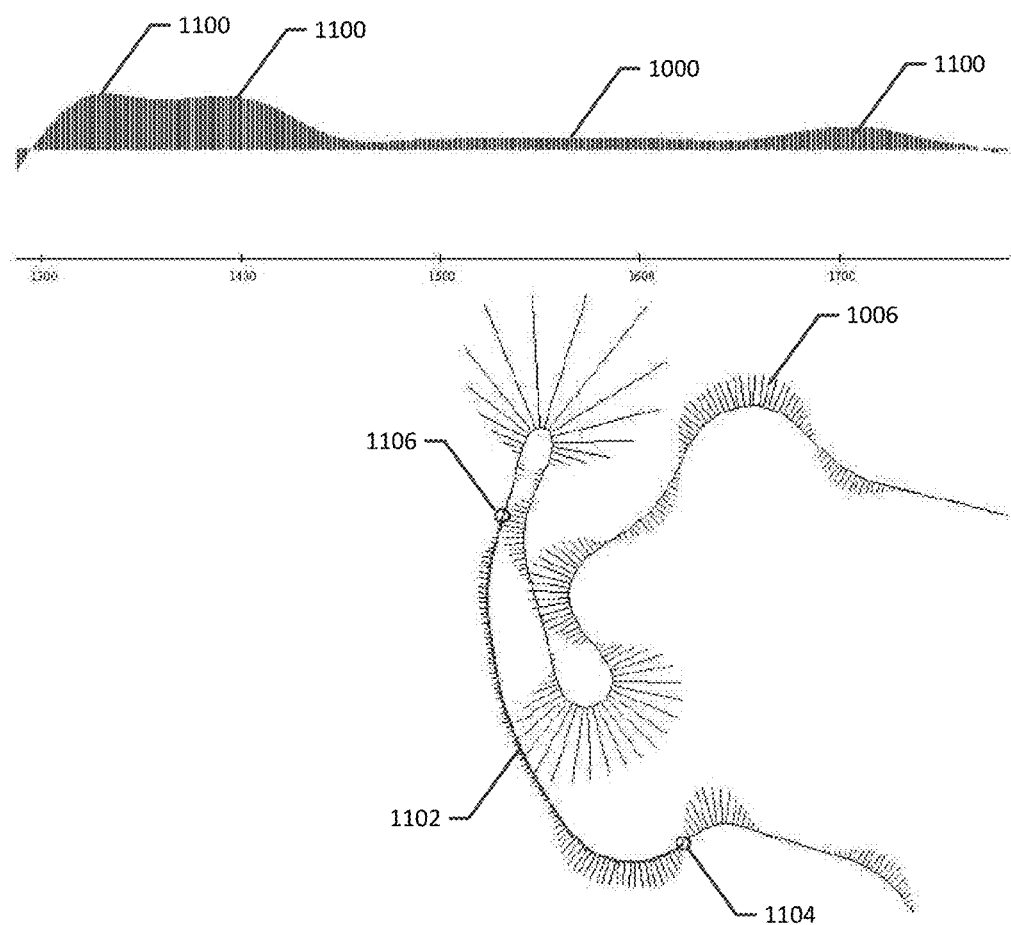
Figure 12:
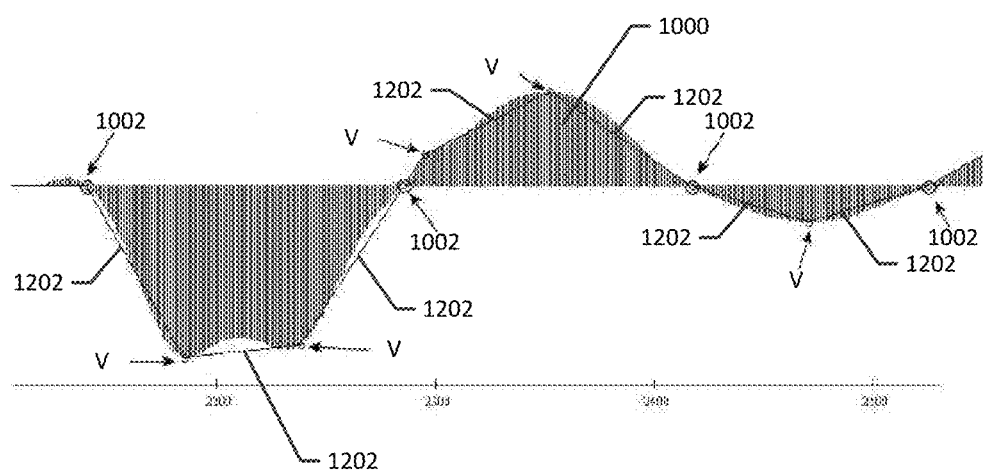
Figure 13:
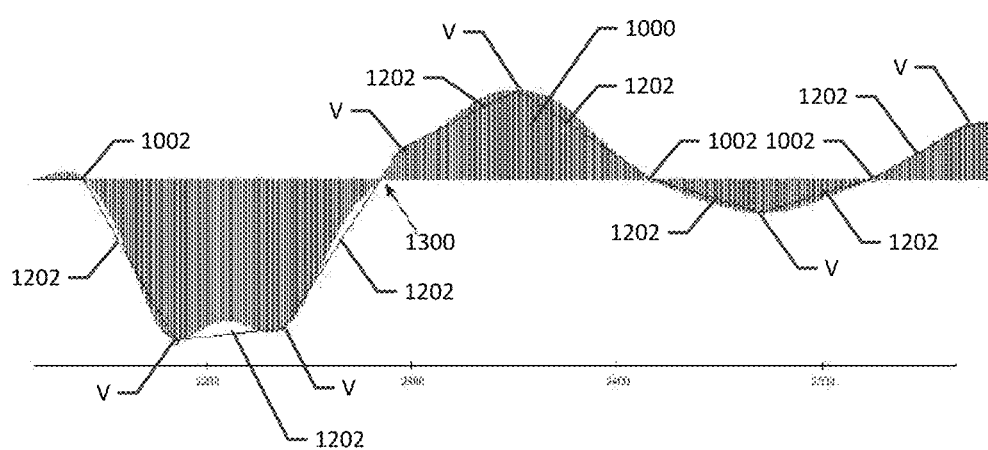
Figure 14:
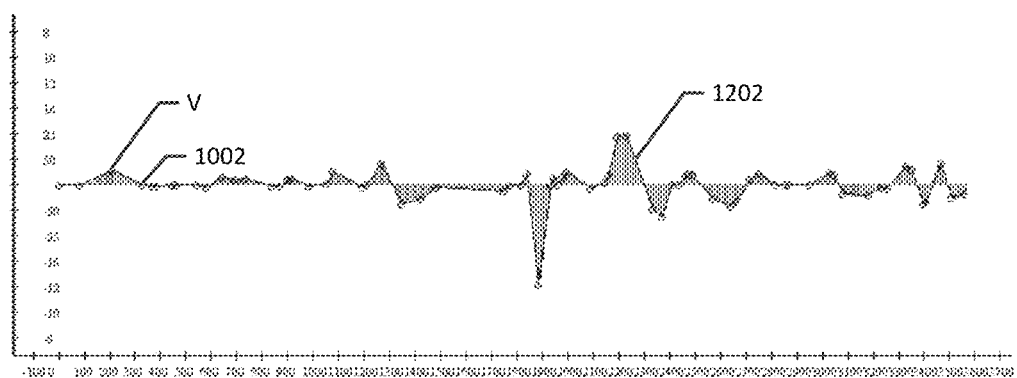
Figure 15:
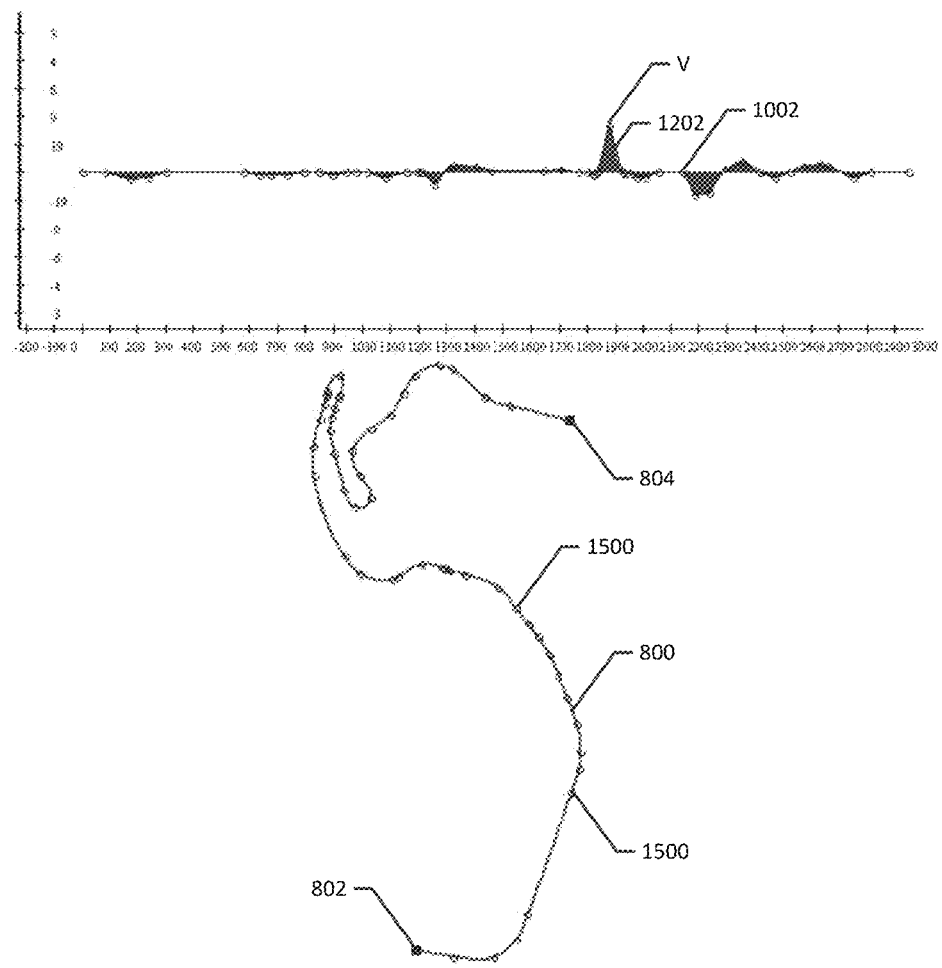

Having thus described certain example embodiments of the present invention in general terms, reference will hereinafter be made to the accompanying drawings which are not necessarily drawn to scale, and wherein:

FIG. 1 is a block diagram of an apparatus that may be specifically configured in accordance with an example embodiment of the present invention;

FIG. 2 is a block diagram illustrating a plurality of applications that a processor of the apparatus of FIG. 1 is configured to execute in accordance with an example embodiment of the present invention;

FIG. 3 is a block diagram of a road segment data record from a geographic database, such as provided by the apparatus of FIG. 1, according to an example embodiment of the present invention;

FIG. 4 is a block diagram of data attributes for the road segment data record of FIG. 3 in accordance with an example embodiment of the present invention;

FIG. 5 is a flowchart illustrating operations performed, such as by the apparatus of FIG. 1, in accordance with an example embodiment of the present invention;

FIG. 6 is a representation of an analytical curve and the clothoid curve parameters derived therefrom in accordance with an example embodiment of the present invention;

FIGS. 7a and 7b are flowcharts illustrating operations performed, such as by the apparatus of FIG. 1, in accordance with an example embodiment of the present invention;

FIG. 8 is a representation of an analytical curve that represents a portion of a road network;

FIG. 9 is a representation of a curvature profile of the analytical curve of FIG. 8;

FIG. 10 is a graphical representation of the zero-crossings of a curvature profile as determined in accordance with an example embodiment of the present invention;

FIG. 11 is a graphical representation of a multi-modal curve comprised of two or more curve sections in accordance with an example embodiment of the present invention;

FIG. 12 is a graphical representation of the manner in which a curvature profile of a plurality of curve sections is approximated with polylines in accordance with an example embodiment of the present invention;

FIG. 13 is a graphical representation of the approximation of the curvature profile of the curve sections with polylines as shown in FIG. 12 following filtering of a break-point in accordance with an example embodiment of the present invention;

FIG. 14 is a graphical representation of the curvature profile of FIG. 9 following its approximation in accordance with an example embodiment of the present invention; and FIG. 15 illustrates the break-points along an approximation of the curvature profile and along the underlying splines in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to convert one or more sections of an analytical curve that represents a portion of a road network to respective clothoids. Once the road geometry is converted to a clothoid representation, the clothoid representation may be utilized for mapping, such as by a map display, and/or to support ADAS capabilities. By way of example, FIG. 1 is a block diagram of map-enhanced ADAS architecture 100. In this example, the map-enhanced ADAS architecture includes driver assistance applications 114 and an apparatus that embodies a map and positioning engine (MPE) 116. The MPE is shown in FIG. 1 as a standalone module; however, it is understood that the MPE may be distributed into multiple packages and/or integrated into other device packages, such as a sensor package. The MPE includes a processor 102, a positioning system 104, a memory 105, a geographic database 106, a communications system 108, and an in-vehicle data bus interface 110. The MPE may also include other hardware, software, and/or firmware, such as a power source.

The processor 102 receives inputs from the positioning system 104, the geographic database 106, the communication system 108, the in-vehicle data bus interface 110, and other sources. The processor then processes the inputs using application software programs 200, some of which are described with reference to FIG. 2. In some embodiments, the processor 102 (and/or co-processors or any other processing circuitry assisting or otherwise associated with the processor) may be in communication with the memory device 105 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 105 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication system 108 may be any means such as a device or circuitry embodied in either hardware or a combination of hardware and software that is configured to receive and/or transmit data from/to other electronic devices in communication with the apparatus, such as by being configured to receive data from an in-vehicle global positioning system (GPS), in-vehicle navigation system, a personal navigation device (PND), a portable navigation device or other in-vehicle data collection system. In this regard, the communication system may include, for example, an antenna (or multiple antennas) and supporting hardware and/or software for enabling communications with a wireless communication network. Additionally or alternatively, the communication system may include the circuitry for interacting with the antenna(s) to cause transmission of signals via the antenna(s) or to handle receipt of signals received via the antenna(s). In some environments, the communication system may alternatively or also support wired communication.

The processor 102 of the illustrated embodiment is configured to provide outputs to the driver assistance applications 114 via the in-vehicle data bus interface 110 and a data bus 112. In an example embodiment, the in-vehicle data bus interface and the data bus are a Controller-Area Network (CAN) interface and a CAN bus, which are designed for automotive applications. The driver assistance applications may include adaptive headlight aiming, adaptive cruise control, obstruction detection, obstruction avoidance, collision avoidance, adaptive shift control, autonomous driving and others.

The positioning system 104 may utilize GPS-type technology, a dead reckoning-type system, or combinations of these or other systems, which are known in the art. The positioning system may also include suitable sensing devices that measure the traveling distance speed, direction, orientation, and so on. For example, the positioning system may include a global positioning system (GPS) and a gyroscope. The positioning system provides an output signal to the processor 102. Some of the application software programs 200 that run on the processor use the output signal from the positioning system to determine the location, direction, orientation, etc., of the MPE 116.

The geographic database 106 is designed for ADAS applications. Like a navigation system geographic database, the geographic database contains data about roads and intersections in a geographic region. For example, the geographic database contains at least one database record (also referred to as "entity" or "entry") for each road segment (also referred to as a link). The road segment data record includes data providing clothoid parameters describing the geometric two dimensional and/or three dimensional shape of the road. The end points (also referred to as nodes) of the road segment correspond to the first and last clothoid end points. When the road segment is represented as one or more clothoids, the road segment data record includes data, such as in accordance with FIG. 6, that provides the geographic coordinates, e.g., latitude and longitude, of the clothoid end-point coordinates $P_S$, $P_E$ and the end-point tangent headings $\theta_S$, $\theta_E$ and/or the end-point coordinates $P_S$, $P_E$ and the end-point curvatures $\kappa_S$, $\kappa_E$. Although the length L of each clothoid curve is not required to define the clothoid since the length may be derived, the road segment data record may also include the length in order to potentially improve the computational performance for ADAS applications. Even though clothoids are two dimensional curves, the road segment data record may also include altitude and slope (when available) at each clothoid end point (or as a continuous function). Furthermore, since successive clothoids will share common end point coordinates and possibly identical headings, curvatures, height and slope, those properties that are common amongst adjacent clothoids need only be stored once to save memory. A road segment data record is further described with reference to FIG. 3.

As another example, when the road segment is represented as B-spline or Bezier curve(s), the road segment data record includes data providing the geographic coordinates (e.g., the latitude, longitude, and altitude) of control points. Additionally, the road segment data record may also contain a knot vector for B-spline geometry. When the road segment is represented as shape point geometry, the road segment data record includes data providing the geographic coordinates (e.g., the latitude, longitude, and altitude) of the end points of the represented road segment. For curved segments, the road segment data record also includes data providing the geographic coordinates (e.g., the latitude, longitude, and altitude) of the shape points used to characterize the polyline.

In an embodiment in which the map representation maintained by the geographic database 106 is a clothoid representation, each road segment is represented by one or more clothoids. In this example embodiment, the clothoid representation of the map may be created by a server, rather than in real-time in a vehicle. Alternatively, the map representation may be an analytical curve, such as a B-spline, that may be converted in real-time or near real-time to a clothoid representation for ADAS applications.

The geographic database 106 may include higher quality, that is, more accurate, data than the data typically contained in a navigation system geographic database. For example, with respect to road geometry, the data in the geographic database may be more accurate with respect to longitude, latitude, and/or altitude. Also, the starting and stopping locations of tunnels may be more accurately specified in the geographic database. Further, the data in the geographic database may be more accurate with respect to derived information, such as curvature.

The geographic database 106 may also include more kinds of data (e.g., more kinds of attributes) than the data typically contained in a navigation system geographic database. For example, the geographic database may include data about road objects, such as signs and crosswalks, including their positions along a road segment, sign object type, and sign text. Some of the data attributes found in the geographic database are described with reference to FIG. 4.

FIG. 2 is a block diagram depicting some of the software applications 200 available to the processor 102. The software applications depicted in FIG. 2 include a map access application 202, a map update application 204, a vehicle positioning application 206, an electronic horizon application 208, and an interface application 210. As this is not an exhaustive list of all the software applications available to the processor, FIG. 2 also depicts other applications 212, which may include a startup routine, self-test diagnostics, and so on.

The map access application 202 provides data access to the geographic database 106 stored on physical storage media. The map access application receives a request for data from the processor 102 and locates data responsive to the request on the physical storage media. The map access application preferably provides an application programming interface (API) for use by the processor and/or the applications 200.

The map update application 204 facilitates updates to the geographic database 106. The communications system 108 receives one or more parcels that either add additional coverage to an existing database or replace existing parcels. A parcel is a unit of storage for storing geographic data in the geographic database on physical storage media. For new parcels, the map update application stores the parcel on the physical storage media. For existing parcels, the map update application replaces the old parcel with the new parcel on the physical storage media.

The vehicle positioning application 206 determines the vehicle's position relative to a road network that is represented by data included in the geographic database 106. The vehicle positioning application uses the output from the positioning system 104 and matches the output to data in the geographic database using a vehicle positioning algorithm, which is sometimes referred to as a map matching algorithm.

The electronic horizon application 208 determines an electronic horizon. An electronic horizon is a collection of roads and intersections leading out from the current vehicle position to an extent determined by the electronic horizon application. The collection of roads and intersections are potential paths that the vehicle may follow from the current vehicle position. The electronic horizon application determines extent using one or more costing functions. The costing functions are based on the needs of the driver assistance applications 114 and may take into consideration various factors, such as vehicle speed, travel time, and driving distance. An example electronic horizon application is described in U.S. Pat. No. 6,405,128, which is assigned to the same assignee as the current application and is hereby incorporated by reference in its entirety.

The interface application 210 controls communications between the MPE 116 and the driver assistance applications 114 via the interface 110 and the bus 112. In an example embodiment, the interface application is based on the CAN protocol, which is a serial communication protocol for communicating between various electronic devices in the vehicle. In accordance with the CAN protocol, the various electronic devices in the vehicle can be coupled to a single serial bus (e.g., the bus 112) such that messages and data can be sent from one electronic device in the vehicle to another. The CAN protocol is a message based protocol in which CAN frames are placed on a common CAN bus. The CAN bus may be a single wire or a differentially driven pair of wires.

FIG. 3 is a block diagram of a road segment data record 300 from the geographic database 106. The road segment data record includes data used to represent a portion of the road. The data include node data 302, 304 which identify the end points of the road segment, e.g., latitude and longitude, of the clothoid end-point coordinates $P_S$, $P_E$ and the end-point tangent headings $\theta_S$, $\theta_E$ and/or the end-point coordinates $P_S$, $P_E$ and the end-point curvatures $\kappa_S$, $\kappa_E$. Although not shown in FIG. 3, the road segment data record may also optionally include the length L of each clothoid curve. Further, the road segment data record may also include altitude and/or slope (when available) at each clothoid end point. Additionally or alternatively, the altitude and/or slope may be stored as a continuous function, such as a function of using a B-spline or Bezier curve. The data also optionally includes clothoid parameter data 306, 308 which identify the same type of data parameters (at least to the extent that the data parameters are not duplicative of those stored in conjunction with other nodes) at points between the end points that can be used to represent the shape of a straight or curved segment. While the data for two clothoids are shown in FIG. 3, it is understood that a segment can contain more than one curve and the number of clothoids may depend on the number and shape of the curves in the segment. The data further include attributes 310 for the segment. Some of the attributes 310 of the segment are depicted in FIG. 4. The road segment data record may include additional data, such as shape point data, as well and/or spline representations, e.g., B-splines or Bezier curves, as well. In this regard, spline representations may be three dimensional and may model continuous height as slope such that different curve representations may offer advantages in certain ADAS applications. For example, Bezier curves can be used to efficiently (relative to B-splines) create polylines and to compute curvature, slope and heading.

FIG. 4 is a block diagram of some of the data attributes 310 for a road segment data record 300. The data attributes depicted in FIG. 4 include segment identification (ID) 402, clothoid parameters 404, direction of travel 406, speed category 408, lane category 410, road type 412, segment characteristics 414 and access characteristics 416. As this is not an exhaustive list of all the data attributes for the road segment data records, FIG. 4 also depicts other attributes 418. For example, the segment data attributes may also include references to node data records in the form of a node ID corresponding to end points 302, 304 of the segment.

The segment ID 402 identifies a data record in the geographic database 106. The clothoid parameters 404 contain bit flags that provide additional information regarding clothoids to aid in the creation of curvature and slope profiles. For example, the clothoid parameters may include a byte-size flag per clothoid. One of the bits in the flag is assigned to curvature, while another of the bits is assigned to slope. If the curvature bit flag is set to one, then the clothoid is marked as part of the curvature profile, such as to construct a two dimensional representation of the road geometry. Similarly, if the slope bit flag is set to one, then the clothoid is marked as part of the slope profile, such as to construct a three dimensional representation of the road geometry.

The direction of travel attribute 406 represents the allowed direction of traffic flow on a segment. For example, the segment may represent a portion of a road network in which travel is permitted in both directions. Alternatively, the segment may represent a portion of a road network allowing only one-way travel. The direction of travel attribute identifies whether the segment allows bi-directional travel or unidirectional travel, and if unidirectional, the direction of travel attribute also identifies the allowed direction of travel. The speed category attribute 408 represents the general speed trend of a road based on posted or implied speed limit. The speed category attribute contains data associated with a speed range. For example, the speed category attribute may include a data representation of the integer 1 for speeds exceeding 80 mph, the integer 2 for speeds in the range of 65-80 mph, the integer 3 for speeds in the range of 55-64 mph, and so on until the speed range includes 0 mph.

The lane category attribute 410 represents the predominant number of lanes on a segment in one direction of travel. In an example embodiment, the lane category attribute does not include turn lanes. If the number of lanes is different for each direction, the lane category attribute may represent the higher number. The road type attribute 412 represents the type of road and/or functional class that the segment represents. For example, the road type attribute may contain data associated with an interstate highway, a controlled access highway, a pedestrian walkway, and so on. The segment characteristic attribute 414 contains bit flags that describe various characteristics of the segment. For example, the segment characteristic attribute may identify whether a segment is paved, a ramp, a bridge, a tunnel, a roundabout, and so on. The access characteristic attribute 416 contains bit flags that define the types of traffic allowed on the segment. For example, the access characteristic attribute may identify whether cars, buses, trucks, taxis, emergency vehicles, pedestrians, and so on are allowed on the segment.

Referring now to FIG. 5, a flowchart is depicted that illustrates operations performed in order to convert an analytical curve that represents a portion of a road network to respective clothoids. As shown in block 500, the apparatus of an example embodiment includes means, such as the processor 102 or the like, for determining a plurality of break-point locations along the analytical curve that represents a portion of a road network. The analytical curve may represent a point or polyline road link geometry which has been converted, such as described by U.S. Pat. Nos. 8,762, 046 and 7,725,424, the contents of which have been incorporated in their entirety herein, into a plurality of splines, such as B-splines. However, the analytical curve may be any of a wide variety of other smooth analytical curves. In order to determine the break-point locations along the analytical curve, the apparatus, such as the processor, determines the plurality of break-point locations dependent upon a curvature profile of the analytical curve so as to define one or more sections of the analytical curve based upon the break-point locations.

The break-point locations along the analytical curve define respective sections of the analytical curve with each section of the analytical curve extending between a pair of neighboring break-point locations. In an instance in which the analytical curve is represented by a plurality of splines, the break-point locations are described by the B-spline (u) parameter and the arc length along the curve, such as the length from the beginning of the analytical curve to the respective break-point location. Once the break-point locations have been determined, each section of the analytical curve is converted to one or more clothoids, such as a sequence of clothoids. In this regard, clothoids are utilized as transition curves in road design and are also known as the Cornu spiral or Euler's spiral. Clothoids are two-dimensional parametric curves with a property that their curvature κ(t) is a linear function of the arc length s of the curve. Points on the clothoid are obtained by evaluating the following Fresnel integrals:

$$x=C(t), y=S(t) \text{ where } S(t)=\alpha\int_0^t \sin(u^2)du, C(t)=\alpha\int_0^t \cos(u^2)du \text{ and the arc length } s(t)=\alpha t$$

An alternate representation of clothoids may be obtained by transforming the unit clothoid by applying a rotation, translation and scale factor.

The break-point locations are determined based upon the linear curvature properties of the clothoids. Since the curvature of a clothoid varies linearly, including instances in which the curvature is constant and there is no change, the break-point locations may be identified based upon linear sections in the curvature profile of the analytical curve. As described below, the curvature profile of the analytical curve may therefore be approximated by a polyline with each vertex and zero-crossing of the polyline becoming a break-point, thereby yielding a sequence of break-point parameters $u_0, u_1, \ldots u_n$ in the range $u=[0, u_{max}]$ that determine a start and end-point of each clothoid along the spline curve. The start and end of the spline curve, that is, $u=0$ and $u=u_{max}$, are implicit break-points. The clothoid parameters that, in turn, define the sequence of clothoids are determined from the analytical curve at each break-point location including the implicit break-point locations at the beginning and the end of the analytical curve. As such, the apparatus, such as the processor 102, is configured to determine the plurality of break-point locations in a manner that is dependent upon the curvature profile of the analytical curve, thereby defining one or more sections of the analytical curve based upon the break-point locations.

As noted above, the apparatus, such as the processor 102, then converts the sections of the analytical curve to respective clothoids, such as by determining clothoid parameters at the break-point locations based upon corresponding parameters of the analytical curve. For example, the clothoid parameters that are determined from the break-point locations along the analytical curve include the clothoid arc length L of a respective clothoid, the end-point coordinates of a respective clothoid including start-point coordinates $P_S$ and the end-point coordinates $P_E$ and either the end tangent headings of the respective clothoid, such as the tangent heading $\theta_S$ at the start-point of the respective clothoid and the tangent heading at the end-point of the $\theta_E$ at the end-point of the respective clothoid or the end curvatures of the respective clothoid including the end curvature $\kappa_S$ at the start-point of the respective clothoid and the end curvature $\kappa_E$ at the end-point of the respective clothoid.

In other words in an instance in which the clothoid is determined based upon the end-point coordinates and end tangent headings, the apparatus, such as the processor 102, is configured to convert one or more sections of an analytical curve to a respective clothoids and includes means, such as the processor or the like, for determining coordinates of the analytical curve at the start break-point and the end break-point, means, such as the processor or the like, for determining tangent headings of the analytical curve at the start break-point and the end break-point and means, such as the processor or the like, for determining the respective clothoid based upon the coordinates and the tangent headings of the analytical curve at the start break-point and the end break-point. See blocks 502, 504 and 506 of FIG. 5. Alternatively, in an instance in which the apparatus, such as the processor, is configured to convert one or more sections of an analytical curve to respective clothoids utilizing end-point coordinates and end curvatures, the apparatus includes means, such as the processor or the like, for converting one or more sections of the analytical curve to respective clothoids that includes means, such as the processor or the like, for determining coordinates of the analytical curve at the start break-point and the end break-point, means, such as the processor or the like, for determining curvatures of the analytical curve at the start break-point and the end break-point and means, such as the processor or the like, for determining the respective clothoid based upon the coordinates and the curvatures of the analytical curve at the start break-point and the end break-point. In either instance, the apparatus, such as the processor, is configured to repeat the foregoing process for each section of the analytical curve as shown in block 508.

By way of example, a portion of an analytical curve is presented in FIG. 6. Three break-point locations have been determined along the portion of the analytical curve, thereby defining two clothoids with clothoid$_1$ extending from a first start-point 1S to a first end-point 1E and a second clothoid extending from a second start-point 2S, coincident with the first end-point 1E, to a second end-point 2E. The apparatus, such as the processor 102, of an example embodiment is configured to convert each section of the analytical curve to a respective clothoid utilizing either the end-point coordinates $P_S$, $P_E$ and the end tangent headings $\theta_S$, $\theta_E$ or the end-point coordinates $P_S$, $P_E$ and the end curvatures $\kappa_S$, $\kappa_E$. In an instance in which the end tangent headings are utilized, a sequence of clothoids that have matching headings at the junctions, such as the break-point locations, is generated, albeit with a potential slight curvature discontinuity at the junctions. However, reliance upon the end curvatures will generate a sequence of clothoids with matching curvatures at the junctions, such as the break-point locations, but with potential slight heading discontinuities at the junctions.

In order to convert the sections of the analytical curve to respective clothoids, the apparatus, such as the processor 102, determines the analytical curve properties at the break-point locations. Break-point locations that are closer together will generally permit clothoids to be generated that more closely match the underlying analytical curve relative to break-point locations that are further spaced from one another. For a section of an analytical curve that extends from a break-point location $u_A$ to a break-point location $u_B$, the respective clothoid may be determined as follows: Clothoid=$f(P_A, P_B, \theta_A, \theta_B)$ for a clothoid based upon end-point coordinates and end tangent headings or Clothoid=$f(P_A, P_B, \kappa_A, \kappa_B)$ for a clothoid based upon end-point coordinates and end curvatures. In either instance, in an embodiment in which the analytical curve is represented by a non-uniform cubic B-spline, the corresponding B-spline properties may be determined by the processor as follows: $P_A$=Spline point $(u_A)$, $P_B$=Spline point $(u_B)$, $\theta_A$=Spline heading $(u_A)$, $\theta_B$=Spline heading $(u_B)$. Thus, one or more sections of an analytical curve may be efficiently and reliably converted to respective clothoids, such as for utilization in conjunction with map displays and to support ADAS capabilities.

Referring now to FIG. 7, a more detailed flowchart of the operations performed in order to convert an analytical curve to a sequence of clothoids is depicted. As described above, the analytical curve is representative of a portion of a road network. As also described above, the analytical curve may be mathematically represented in various manners including as a B-spline curve. In this regard, FIG. 8 depicts a portion of a road network as represented by an analytical curve 800 and, more particularly, by a B-spline curve, that extends from the beginning 802 of the link to the end 804 of the link.

As shown in block 700 of FIG. 7a, the apparatus includes means, such as the processor 102 or the like, for determining a curvature profile defining a curvature of the analytical curve at a respective arc length. In this regard, a curvature profile is a sequence of curvature values along the curve with corresponding arc length values, as measured from the beginning 802 of the link, for example. The curvature profile is therefore an ordered array of [curvature, arc length] value pairs. For example, a curvature profile may be represented as follows: $[(\kappa, s)_1, (\kappa, s)_2 \ldots (\kappa, s)_D]$. FIG. 9 depicts an example of the curvature profile along a portion of the analytical curve representative of the road network of FIG. 8 with the curvatures being sampled with equal spacing, such as every one meter, along the analytical curve. In the curvature profile of FIG. 9, the vertical axis denotes the curvature magnitude [1/m] with units in 1/radius as measured in 1/meters and the horizontal x-axis represents the arc length, such as the road length in meters, from the beginning of the analytical curve to the end of the analytical curve.

As shown in block 702 of FIG. 7a, the apparatus of this example embodiment also includes means, such as the processor 102 or the like, for identifying one or more zero-crossings in the curvature profile so as to define curves therebetween. In this regard, each curve is defined between a pair of neighboring zero-crossings as identified from the curvature profile. The zero-crossings are identified so as to permit the curvature profile to be more accurately linearized, such as with polylines. As such, the zero-crossings permit each curve in the road to be separately identified and then to be separately processed as desired as a result of the logarithmic scale of curvature. In this regard, since curvature varies from zero for straight sections to positive or negative infinity, a curvature segmentation threshold is established for each curve as described below.

In an example embodiment, the zero-crossings of the curvature profile are identified in an instance in which the sign of the curvature changes in the curvature profile at location i, such as by changing from one point $(\kappa, s)_i$ along the curvature profile to the next point $(\kappa, s)_{i+1}$. The apparatus, such as the processor, of an example embodiment then identifies the zero-crossing $u_{zero\_crossing}$ as the linear intersection between $(\kappa, s, u)_i$, $(\kappa, s, u)_{i+1}$ and $\kappa=0$ as follows:

$$u_{zero\_crossing} = u_i + t(u_{i+1} - u_i) \text{ where}$$

$$t = \frac{\kappa_i}{(\kappa_i - \kappa_{i+1})}$$

The apparatus, such as the processor 102, of this example embodiment is also configured to determine the arc length for the zero-crossings, such as from the beginning 802 of the analytical curve 800 as follows:

$$s_{zero\_crossing} = s_i + t(s_{i+1} - s_i)$$

In this regard, FIG. 10 depicts a portion of the curvature profile 1000 of FIG. 9 with the zero-crossings 1002, that is, the points at which the curvature profile crosses the x-axis being circled. FIG. 10 also depicts the corresponding portion of the spline curve 1004 with linear extensions 1006 extending perpendicular from the spline curve at each of a plurality of locations. The length of each extension is representative of the curvature at the respective location and the direction in which each extension extends indicates whether the curvature is positive or negative. In this regard, the linear extensions extending to one side of the spline curve are representative of the locations along the analytical curve that have a positive curvature and the linear extensions to the opposite side of the spline curve are representative of locations having a negative curvature. The zero-crossing locations are also identified along the spline curve. Between each pair of neighboring zero-crossings, a different curve section is defined.

The apparatus of an example embodiment also includes means, such as the processor 102 or the like, for determining, for each curve section identified between respective zero-crossings 1002 of the curvature profile 1000, whether the curve section is straight. See block 704. In an instance in which a curve section is determined to be straight, the respective curve need not be further approximated with polylines, as will be described below for curves that are not straight sections. Instead, the apparatus, such as the processor, is configured to create a straight curvature line for the straight curve section, as shown in block 706. In an example embodiment, the apparatus, such as the processor, is configured to determine if a curve section is a straight section based upon the subtended angular arc of the curve section. In this regard, the apparatus, such as the processor, is configured to determine whether a subtended angular arc (based on the average curvature of the curve section) is within a predefined threshold of a chord of the curve section. While the predefined threshold may have various values, the predefined threshold of one example embodiment is 0.15 meters. The apparatus, such as the processor, of this example embodiment is configured to identify the curve to be straight in an instance in which the subtended angular arc of the curve is within the predefined threshold of the chord of the curve. In an instance in which the curve section is identified to be straight, the apparatus, such as the processor, is configured to create a straight curvature profile line, such as a straight polyline, extending from the zero-crossings at the beginning and end of the curve section prior to proceeding with the analysis of the next curve section.

In an instance in which a curve section is not identified to be straight, the apparatus of an example embodiment may include means, such as the processor 102 or the like, for determining if the respective curve section includes one or more kinks, such as a sharp corner with only C0 discontinuity, and, if so, to split the curve at the kink location into curve sections, thereby ensuring that one clothoid will end at the location of the kink and a next clothoid will begin at the location of the kink. See blocks 708 and 710 of FIG. 7a. Kinks may be determined in various manners, but the location of a kink along a curve section may be identified in an instance in which the curve section is a cubic non-uniform B-spline by a knot multiplicity of three at the respective location. In an instance in which a kink is identified, the curve section is split into two or more curve sections at the kink location. By splitting the curve into curve sections at the kink and ensuring that each curve section will be converted to one or more respective clothoids such that one clothoid ends at the location of the kink and another clothoid begins at the location of the kink, the resulting clothoids will more accurately represent the analytical curve at the location of the kink.

As shown in blocks 712 and 714 of FIG. 7a, the apparatus of an example embodiment also includes means, such as the processor 102 or the like, for determining if a curve section is multi-modal and, if so, splitting the multi-modal curve into individual curve sections. Multi-modal curve sections represent curves in a road that have two or more curvature peaks. In order to more accurately represent the multi-modal curve section with clothoids, each curve of the multi-modal curve section is treated as an individual curve section with a separate maximum curvature value. By way of example, FIG. 11 depicts a portion of a curvature profile 1000 having two or three multi-modal peaks 1100 depending upon the sensitivity threshold with which separate curvature peaks are identified. FIG. 11 also depicts a portion of the analytical curve 1102 representative of the portion of the road network that extends between end points 1104 and 1106. The analytical curve of FIG. 11 also includes extensions 1006 extending perpendicular to the analytical curve with the length of the extensions representative of the curvature values at different locations along the analytical curve. These extensions similarly illustrate the multi-modal nature of the portion of the curve.

The apparatus of this example embodiment therefore includes means, such as the processor 102 or the like, for identifying a curve to be multi-modal. See block 712 of FIG.

7a. The apparatus, such as the processor, may identify a curve to be multi-modal in various manners including by statistical methods, such as clustering techniques, or analytically. For example, the apparatus, such as the processor, of an embodiment identifies a curve to be multi-modal based on an analysis of the intersection of the curvature profile lines and, more particularly, by determining if the extension of any curvature profile line intersects the x-axis between its zero-crossings 1002. In an instance in which a curvature profile line intersects the x-axis of the curvature profile between its zero-crossings, a multi-modal curve is identified. The apparatus of this example embodiment also includes means, such as the processor or the like, for splitting the multi-modal curve into two or more curve sections. See block 714 of FIG. 7a. For example, in an instance in which a curve section is identified to be multi-modal as a result of a curvature profile line intersecting the horizontal x-axis of the curvature profile between the zero-crossings, the apparatus, such as the processor, is configured to split the curve section at that point, that is, the point having an arc length s value where a curvature profile line intersects the x-axis. In another example, the curvature profile is split at the arc length location corresponding to the midpoint between the curvature peaks. Other ways of splitting the curve section to separate curvature peaks are also possible. The apparatus, such as the processor, may be configured to repeat this process recursively until a multi-modal curve has been split into curve sections such that none of the resulting curve sections are multi-modal.

As shown in block 716 of FIG. 7a, the apparatus of an example embodiment also includes means, such as the processor 102 or the like, for determining a line approximation threshold based on the maximum curvature. In this regard, for each curve section, the apparatus, such as the processor, is configured to determine the line approximation threshold based on the maximum curvature $\kappa_{MAX}$ of the respective curve section. The line approximation threshold is determined based on the maximum curvature $\kappa_{MAX}$ of each respective curve section since a fixed or predefined line fit threshold is generally not able to be utilized for the entire analytical curve, such as an entire spline due to, the logarithmic nature of curvature. In an example embodiment, the apparatus, such as the processor, is configured to define the line approximation threshold T to be proportional to the maximum curvature $\kappa_{MAX}$ of each curve section, such as follows: $T=\xi\kappa_{MAX}$. In this example embodiment, the threshold scaling parameter $\xi$ may vary depending on road attributes, such as functional class. Alternatively, a fixed or predefined threshold scaling parameter $\xi$ may be utilized.

For those curve sections that have not been identified to be straight, the apparatus of an example embodiment also includes means, such as the processor 102 or the like, for approximating the curvature profile of a curve section with a polyline and, consequently, for approximating the curvature profile of the curve with a plurality of polylines. See block 718 of FIG. 7a. A curvature profile may be approximated with polylines in various manners. However, the apparatus, such as the processor, of an example embodiment utilizes a recursive Douglas-Peuker line simplification technique, using a maximum error split location, to approximate the curvature profile. The Douglas-Peuker line simplification technique approximates the curvature profile for a curve section recursively until all polyline segments are within a specified tolerance T, such as described above.

In this regard, FIG. 12 depicts the curvature profile 1000 for a portion of a curve and the polylines 1202 created by the Douglas-Peuker line simplification technique. As shown, polyline vertices V are identified at the intersection of adjacent polylines and the vertices, along with the zero-crossings 1002, comprise the break-point locations that serve as the start-point and the end-point of each respective clothoid curve. Thus, the apparatus of an example embodiment includes means, such as the processor 102 or the like, for determining the break-point locations based upon vertices and zero-crossings of the plurality of polylines with which the curvature profile of the curve has been approximated.

As shown in blocks 720 and 722 of FIG. 7a, the foregoing process of determining the break-point locations of a curvature profile and then approximating the curvature with polylines is repeated for each curve section. With reference to block 724 and 726 of FIG. 7b, the apparatus of an example embodiment includes means, such as the processor 120 or the like, for determining if adjacent polylines should be merged and, if so, then merging some of the adjacent polylines so as to filter out intervening break-points and permitting the adjacent curve sections that have been merged to be effectively represented by a single clothoid. By way of example, the apparatus, such as the processor, of an example embodiment is configured to eliminate break-points and therefore merge adjacent curve sections in an instance in which the curvature of a polyline across a zero-crossing 1002 changes linearly or approximately linearly, such as within a predefined linearity threshold, thereby permitting the zero-crossing vertex to be eliminated. As another example, the apparatus, such as the processor, may be configured to eliminate break-points for two or more adjacent straight sections the vertex between the adjacent straight sections being eliminated as a result of the merger of the adjacent straight sections. By merging adjacent curve sections, unnecessary clothoids may be eliminated such that the resulting conversion process is more efficient.

By way of example, FIG. 13 depicts the polylines 1202 with which a portion of the curvature profile 1000 is approximated. A break-point otherwise defined by a zero-crossing 1002 as shown in FIG. 12 has been filtered as shown at 1300 since the curvature changed only linearly at the zero-crossing. In other words, the polyline to the left and the right of the zero-crossing vertex had very similar, if not identical slopes. Since clothoids have linear curvature with respect to arc length and therefore correspond to the polylines in FIG. 13, the polyline segments to the left and right of the zero-crossing were merged into a single line segment at 1300 so as to allow a single clothoid to span across the zero-crossing.

While various criteria may be defined with respect to the merging of polylines and the filtration of break-points, break-points are filtered in an example embodiment in an instance in which the resulting clothoids are short, such as by having a length less than three meters, the resulting clothoids are practically straight, such as clothoids having a radius greater than 10,000 meters, and the clothoids have similar α parameter values, such as defined by s(t)=αt as defined above.

Following the merging of adjacent polylines and the filtration of break-points, the resulting approximation of the curvature profile of FIG. 9 is depicted in FIG. 14. In this example embodiment, each vertex V is represented by a circle. Each vertex and zero-crossing 1002 is correspondingly representative of a break-point location that defines the sections of the analytical curve that, in turn, are converted to respective clothoids. In this regard, each pair of adjacent vertices, such as a vertex V or a zero-crossing vertex, at opposite ends of a respective polyline define the break-point locations that serve as the start and end locations of a clothoid. The vertices are shared between each successive clothoid such that the end break-point location of one clothoid is the start break-point location of the successive clothoid. By way of example, FIG. 15 depicts the analytical curve 800, such as the spline, representative of the portion of the road network between a beginning point 802 and an end point 804 with the break-point locations 1500, that is, the vertices and the zero-crossings, identified by circles along the analytical curve. FIG. 15 also depicts the approximation of the curvature profile with the polylines 1202 and corresponding vertices in graphical form.

As described above, each vertex of the curvature profile line approximation is associated with an arc length location along the underlying curve, such as measured from the start at the analytical curve. As described above, the apparatus also includes means, such as the processor 102 or the like, for converting each section of the analytical curve to a respective clothoid. See block 728 of FIG. 7b. In this regard and as described above, each curve section may be converted based upon the coordinates of the analytical curve at the start break-point and the end break-point as well as one of the tangent headings of the analytical curve at the start break-point and the end break-point or the curvatures of the analytical curve at the start break-point and the end break-point. See blocks 502, 504 and 506 of FIG. 5.

In some embodiments, the apparatus, such as the processor 102, is also configured to compare the shape and positional closeness between the resulting clothoid and the underlying analytical curve in order to determine if the respective clothoid sufficiently represents the curve section of the underlying analytical curve. In an example embodiment, the apparatus, such as the processor, is configured to determine curve properties of the clothoid and the corresponding curve section of the underlying analytical curve. For example, the apparatus, such as the processor, may be configured to sample points on the clothoid, such as points spaced apart at a predefined interval, e.g., one meter, and to project the same points onto the curve section, such as the B-spline of the underlying analytical curve. The apparatus, such as the processor, of this example embodiment is configured to compare the curve properties, such as curvature, heading, distance, etc. at each point. If the curve properties of the clothoid deviate from the corresponding properties of the curve section of the underlying analytical curve by more than a predefined tolerance, the respective curve section is split into two or more curve subsections, such as by splitting the respective curve section in two by the insertion of an additional break-point location at the midpoint location of the respective curve section or at the location at which the maximum error between the curve properties occurs. See blocks 730 and 732 of FIG. 7b. Once the curve section has been split into curve subsections, the apparatus, such as the processor, is configured to convert each curve subsection into a clothoid that more accurately represents the respective curve subsections. See block 734 of FIG. 7b. The apparatus, such as the processor, may be configured to repeat this process recursively until the curve properties of each clothoid are within the predefined tolerance of the respective curve section or subsection. As shown in block 736 of FIG. 7b, the apparatus, such as the processor, the memory 105 or the like, is configured to store each clothoid, such as each clothoid that is determined to be within the predefined tolerance of the respective curve section.

As described above, the analytical curve representative of a portion of a road network may be efficiently and accurately converted into respective clothoids, such as for use by a map display or for supporting ADAS capabilities. By utilizing clothoids, the performance of the map display or the ADAS capabilities may be improved, such as in terms of the efficiency of operation.

As described above, a two dimensional road geometry may be represented by a sequence of clothoids. In an example embodiment, however, the method and apparatus is additionally configured to provide a representation of a three dimensional road segment. In this example embodiment, a first sequence of clothoids could be constructed as described above to represent the two dimensional map geometry, while a second sequence of clothoids could be constructed to represent the altitude dimension associated with the road segment, that is, to represent the height of the road segment as a function of arc-length along the two dimensional representation of the road geometry.

FIGS. 5, 7a and 7b illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 105 of an apparatus employing an embodiment of the present invention and executed by a processor 102 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining a plurality of break-point locations along an analytical curve that represents a portion of a road network, wherein determining the plurality of break-point locations comprises determining a curvature profile defining a curvature of the analytical curve at a respective arc length by approximating the curvature profile of a curve with a plurality of polylines, identifying one or more zero-crossings in the curvature profile so as to define curves therebetween and determining the plurality of break-point locations dependent upon vertices and the zero crossings of the plurality of polylines that approximate the curvature profile of the analytical curve so as to define one or more sections of the analytical curve based upon the break-point locations;
   converting one or more sections of the analytical curve to respective clothoids; and
   using the respective clothoids by a map display or to support an advanced driver assistance system (ADAS).

2. A method according to claim 1 wherein converting one or more sections of the analytical curve to respective clothoids comprises:
   for a section of the analytical curve having a start break-point and an end break-point, determining coordinates of the analytical curve at the start break-point and the end break-point;
   determining tangent headings of the analytical curve at the start break-point and the end break-point; and
   determining the respective clothoid based upon the coordinates and the tangent headings of the analytical curve at the start break-point and the end break-point.

3. A method according to claim 1 wherein converting one or more sections of the analytical curve to respective clothoids comprises:
   for a section of the analytical curve having a start break-point and an end break-point, determining coordinates of the analytical curve at the start break-point and the end break-point;
   determining curvatures of the analytical curve at the start break-point and the end break-point; and
   determining the respective clothoid based upon the coordinates and the curvatures of the analytical curve at the start break-point and the end break-point.

4. A method according to claim 1 further comprising:
   determining whether a subtended angular arc of a curve of the curvature profile is within a predefined threshold of a chord of the curve; and
   identifying the curve to be straight in an instance in which the subtended angular arc of the curve is within the predefined threshold of the chord of the curve.

5. A method according to claim 1 further comprising:
   identifying one or more kinks in a curve; and
   splitting the curve into two or more curve sections at the kink.

6. A method according to claim 1 further comprising:
   identifying a curve to be multi-modal; and
   splitting the multi-modal curve into two or more curve sections.

7. An apparatus comprising at least one processor and at least one memory including computer program code, the at least one memory and computer program code configured to, with the processor, cause the apparatus to at least:
   determine a plurality of break-point locations along an analytical curve that represents a portion of a road network, wherein determining the plurality of break-point locations comprises determining a curvature profile defining a curvature of the analytical curve at a respective arc length by approximating the curvature profile of a curve with a plurality of polylines, identifying one or more zero-crossings in the curvature profile so as to define curves therebetween and determining the plurality of break-point locations dependent upon vertices and the zero crossings of the plurality of polylines that approximate the curvature profile of the analytical curve so as to define one or more sections of the analytical curve based upon the break-point locations;
   convert one or more sections of the analytical curve to respective clothoids; and
   provide the respective clothoids for use by a map display or to support an advanced driver assistance system (ADAS).

8. An apparatus according to claim 7 wherein the at least one memory and the computer program code are configured to, with the processor, cause the apparatus to convert one or more sections of the analytical curve to respective clothoids by:
   for a section of the analytical curve having a start break-point and an end break-point, determining coordinates of the analytical curve at the start break-point and the end break-point;
   determining tangent headings of the analytical curve at the start break-point and the end break-point; and
   determining the respective clothoid based upon the coordinates and the tangent headings of the analytical curve at the start break-point and the end break-point.

9. An apparatus according to claim 7 wherein the at least one memory and the computer program code are configured to, with the processor, cause the apparatus to convert one or more sections of the analytical curve to respective clothoids by:
   for a section of the analytical curve having a start break-point and an end break-point, determining coordinates of the analytical curve at the start break-point and the end break-point;
   determining curvatures of the analytical curve at the start break-point and the end break-point; and
   determining the respective clothoid based upon the coordinates and the curvatures of the analytical curve at the start break-point and the end break-point.

10. An apparatus according to claim 7 wherein the at least one memory and the computer program code are further configured to, with the processor, cause the apparatus to:
  determine whether a subtended angular arc of a curve of the curvature profile is within a predefined threshold of a chord of the curve; and
  identify the curve to be straight in an instance in which the subtended angular arc of the curve is within the predefined threshold of the chord of the curve.

11. An apparatus according to claim 7 wherein the at least one memory and the computer program code are further configured to, with the processor, cause the apparatus to:
  identify one or more kinks in a curve; and
  split the curve into two or more curve sections at the kink.

12. An apparatus according to claim 7 wherein the at least one memory and the computer program code are further configured to, with the processor, cause the apparatus to:
  identify a curve to be multi-modal; and
  split the multi-modal curve into two or more curve sections.

13. A computer program product comprising at least one non-transitory computer-readable storage medium having computer-executable program code portions stored therein, the computer-executable program code portions comprising program code instructions configured to:
  determine a plurality of break-point locations along an analytical curve that represents a portion of a road network, wherein determining the plurality of break-point locations comprises determining a curvature profile defining a curvature of the analytical curve at a respective arc length by approximating the curvature profile of a curve with a plurality of polylines, identifying one or more zero-crossings in the curvature profile so as to define curves therebetween and determining the plurality of break-point locations dependent upon vertices and the zero crossings of the plurality of polylines that approximate the curvature profile of the analytical curve so as to define one or more sections of the analytical curve based upon the break-point locations;
  convert one or more sections of the analytical curve to respective clothoids; and
  provide the respective clothoids for use by a map display or to support an advanced driver assistance system (ADAS).

14. A computer program product according to claim 13 wherein the program code instructions configured to convert one or more sections of the analytical curve to respective clothoids comprise program code instructions configured to:
  for a section of the analytical curve having a start break-point and an end break-point, determine coordinates of the analytical curve at the start break-point and the end break-point;
  determine tangent headings of the analytical curve at the start break-point and the end break-point; and
  determine the respective clothoid based upon the coordinates and the tangent headings of the analytical curve at the start break-point and the end break-point.

15. A computer program product according to claim 13 wherein the program code instructions configured to convert one or more sections of the analytical curve to respective clothoids comprise:
  for a section of the analytical curve having a start break-point and an end break-point, determine coordinates of the analytical curve at the start break-point and the end break-point;
  determine curvatures of the analytical curve at the start break-point and the end break-point; and
  determine the respective clothoid based upon the coordinates and the curvatures of the analytical curve at the start break-point and the end break-point.

16. An apparatus according to claim 7 embodied by a map and positioning engine (MPE) or the ADAS.

17. A computer program product according to claim 13 embodied by a map and positioning engine (MPE) or the ADAS.

18. A computer program product according to claim 13 wherein the computer-executable program code portions further comprise program code instructions configured to:
  determine whether a subtended angular arc of a curve of the curvature profile is within a predefined threshold of a chord of the curve; and
  identify the curve to be straight in an instance in which the subtended angular arc of the curve is within the predefined threshold of the chord of the curve.

19. A computer program product according to claim 13 wherein the computer-executable program code portions further comprise program code instructions configured to:
  identify one or more kinks in a curve; and
  split the curve into two or more curve sections at the kink.

20. A computer program product according to claim 13 wherein the computer-executable program code portions further comprise program code instructions configured to:
  identify a curve to be multi-modal; and
  split the multi-modal curve into two or more curve sections.

* * * * *